(12) United States Patent
Komeda et al.

(10) Patent No.: US 6,602,558 B1
(45) Date of Patent: Aug. 5, 2003

(54) NON-LINEAR OPTICAL SILICA THIN FILM MANUFACTURING METHOD AND NON-LINEAR OPTICAL SILICA ELEMENT

(75) Inventors: Osamu Komeda, Anjo (JP); Hiroshi Hasegawa, Shizuoka (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 09/369,264

(22) Filed: Aug. 6, 1999

(30) Foreign Application Priority Data

Aug. 7, 1998 (JP) ............................... 10-224840

(51) Int. Cl.[7] ............................... B05D 5/06; B05D 3/06; G02B 1/08; G02B 1/12; C23C 14/48; C23C 14/08
(52) U.S. Cl. ............................ 427/526; 427/527; 427/529; 427/533; 427/163.1; 117/108; 438/788
(58) Field of Search ................................ 427/526, 527, 427/533, 567, 579, 163.1, 529; 438/787, 788; 117/108

(56) References Cited

U.S. PATENT DOCUMENTS

| | | | | |
|---|---|---|---|---|
| 4,145,457 A | * | 3/1979 | Kersten | 427/527 |
| 4,466,839 A | * | 8/1984 | Dathe et al. | 427/527 |
| 4,521,443 A | * | 6/1985 | Naik et al. | 427/527 |
| 4,599,272 A | * | 7/1986 | Ichikawa | 427/527 |

(List continued on next page.)

FOREIGN PATENT DOCUMENTS

| | | | | |
|---|---|---|---|---|
| JP | 02-187735 | | | 7/1990 |
| JP | 06-242480 | | | 9/1994 |
| JP | 10-90546 | | | 4/1998 |
| JP | 02000098436 | A | * | 4/2000 |
| JP | 02000206578 | A | * | 7/2000 |
| JP | 2001013535 | | * | 1/2001 |

OTHER PUBLICATIONS

*The Condensed Chemical Dictionary*, 10[th]ed., Gessner Hawley Van Nostrand Reinhold Company, N.Y., excerpt pp. 826–827, 1981 No month.*
J. Grant, ed., *HACKH's Chemical Dictionary*, 4[th]ed, McGraw–Hill Book Comp., N.Y., excerpt. p. 532, 1969 No month.*
J. Grant, ed. *HACKH's Chemical Dictionary*, 3[rd]ed. McGraw–Hill Book Comp., Inc., N.Y., 1944 No month.*
Fujiwara, T., et al., "Second–harmonic generation in germanosilicte glass poled with ArF laser irradiation," *Appl. Phys. Lett.*, 71(8):1032–34, Aug. 25, 1997.
Horinouchi, S., et al., "Optical Quadratic Nonlinearity in Corona–Poled Glass Film Waveguides," *Electronics and Communications in Japan*, Part 2, vol. 82, No. 8, 1999 No month Translation from Denshi Joho Tsushin Gekkai Ronbunshi, vol. J79–C–I, No. 8 Aug. 1996, pp. 287–294.

*Primary Examiner*—Marianne Padgett
(74) *Attorney, Agent, or Firm*—Finnegan, Henderson, Farabow, Garrett & Dunner, L.L.P.

(57) ABSTRACT

A non-linear optical silica thin film (22) whose main material is $SiO_2$—$GeO_2$ is formed by irradiating positive or negative polar particles and polarization orientation is carried out in the silica thin film. For example, by repeating, while forming the silica thin film (22), forming the thin film in a state of irradiating positive particles, forming the thin film in a neutral state, such as irradiation of neutral particles or non-irradiation of particles, forming the thin film in a state of irradiating negative particles, and forming the thin film in a neutral state, a plurality of regions (22-1, 22-2, and 22-3) in different states of polarization orientation are formed in a direction of film thickness of the silica thin film (22). Distribution of charges arises in the silica thin film (22) being formed by irradiation of polar particles and polarization orientation is automatically carried out in the silica thin film (22). Thus, without carrying out an post process of polarization orientation, such as application of voltage, a polarization orientation process is completed almost simultaneously with completion of forming the silica thin film (22). Thus, it is possible to form periodical polarization orientation structure in a direction of film thickness.

3 Claims, 9 Drawing Sheets

U.S. PATENT DOCUMENTS

| | | | |
|---|---|---|---|
| 4,787,927 A | * 11/1988 | Mears et al. | 427/163 |
| 4,962,051 A | * 10/1990 | Liaw | 438/976 |
| 4,974,932 A | * 12/1990 | Nattermann et al. | 350/96.33 |
| 5,035,916 A | * 7/1991 | Kalnitsky et al. | 427/527 |
| 5,098,792 A | * 3/1992 | Sebastiano et al. | 427/527 |
| 5,113,473 A | * 5/1992 | Yoshida et al. | 204/192.25 |
| 5,122,483 A | * 6/1992 | Sakai et al. | 427/527 |
| 5,303,318 A | * 4/1994 | Tateda et al. | 385/123 |
| 5,358,890 A | * 10/1994 | Sivan et al. | |
| 5,618,575 A | * 4/1997 | Peter | 427/527 |
| 5,637,353 A | * 6/1997 | Kimock et al. | 427/577 |
| 5,744,370 A | * 4/1998 | Nakamura | 427/527 |
| 5,824,584 A | * 10/1998 | Chen et al. | 438/933 |
| 5,827,786 A | * 10/1998 | Puretz | 427/527 |
| 2001/0019991 A1 | * 9/2001 | Abe et al. | 501/42 |

* cited by examiner

IRRADIATION OF NEUTRAL
PARTICLES OR NON-IRRADIATION
OF PARTICLES

IRRADIATION OF ⊕IONS

IRRADIATION OF NEUTRAL
PARTICLES OR NON-IRRADIATION
OF PARTICLES

IRRADIATION OF ⊕IONS

ELECTRON BEAM OR ⊖ION

IRRADIATION OF NEUTRAL
PARTICLES OR NON-IRRADIATION
OF PARTICLES

⊕ IRRADIATION OF ⊕IONS

IRRADIATION OF NEUTRAL
PARTICLES OR NON-IRRADIATION
OF PARTICLES

IRRADIATION OF
ELECTRON BEAMS OR ⊖IONS

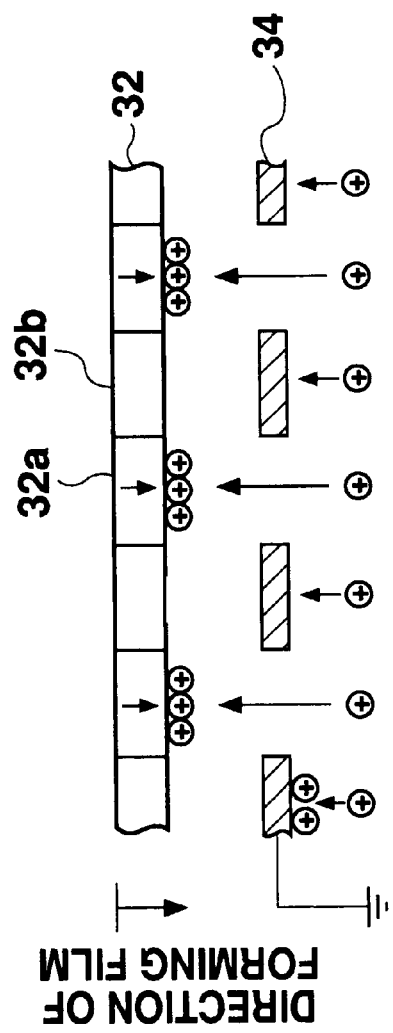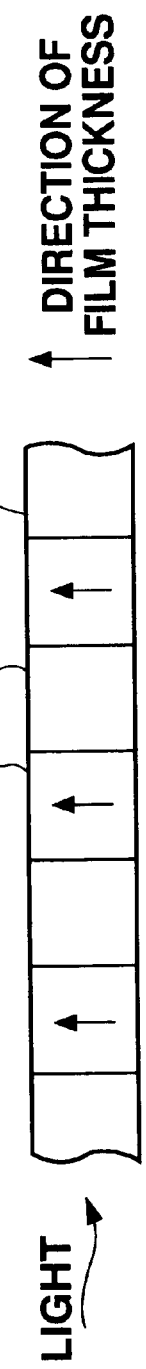
Fig. 8A
Fig. 8B

NON-LINEAR OPTICAL SILICA THIN FILM MANUFACTURING METHOD AND NON-LINEAR OPTICAL SILICA ELEMENT

BACKGROUND OF THE INVENTION

1. Field of the Invention

The present invention relates to non-linear optical silica thin films, particularly non-linear optical silica thin films having a plurality of regions which differ in polarization orientation and a method of manufacturing such a thin film.

2. Description of the Related Art

It is proposed to provide an optical wavelength conversion element or the like which converts fundamental waves into predetermined harmonics with a function of optical conversion by periodically forming polarization inversion regions in a ferroelectric material having a non-linear optical effect so as to have quasi phase matching to incident waves. As the ferroelectric material, a bulk crystal, such as $LiNbO_3$ (lithium niobate) or $LiTaO_3$ (lithium tantalate), which is placed in advance under the control of single directional polarization orientation, is employed. Further, it has been proposed that polarization inversion regions are periodically formed in such a bulk crystal by selectively applying direct current voltage and irradiating a high energy ray to the bulk crystal.

For example, Japanese Patent Laid-Open Publication No. Hei 2-187735 (JPA2-187735) discloses that, as shown in FIG. 1, on a first main surface of $LiNbO_3$, crystal 1 which is subjected to single directional polarization orientation, a first electrode 2 having a striped shape which is applicable to periodical polarization inversion structure to be obtained is formed, and on a second main surface of the crystal 1, a second electrode 3 covering the entire surface is formed. Periodical polarization inversion regions having a pattern which corresponds to that of the first electrode 2 are formed on a surface of the crystal 1 by applying predetermined direct current voltage between the stripe-shaped electrode 2 and the second electrode 3.

Further, Japanese Patent Laid-Open Publication No. Hei 6-242480 (JPA6-242480) discloses that, as shown in FIGS. 2A to 2C, polarization inversion regions penetrating from the surface to the back surface of a crystal substrate are periodically formed by first providing single directional polarization orientation to $LiTaO_3$ crystal and then selectively irradiating a high energy ray to the crystal.

However, in order to periodically form polarization inversion regions in a bulk crystal as described above, a process of forming the polarization inversion regions is required, as well as the primary process of forming the crystal. Further, there is another problem that an amount of polarization inversion regions which can be formed is restricted. For example, in order to periodically form a polarization inversion structure by forming a stripe-shaped electrode as shown in FIG. 1, an electrode patterning process is required and also a process of applying voltage to the electrode is required. Further, since no electrodes for applying voltage can be formed in the bulk crystal 1, the periodical polarization inversion structure cannot be formed in a direction of thickness of the bulk crystal 1. On the other hand, in a method of forming the polarization inversion structure in the bulk crystal by irradiating a high energy ray as shown in FIGS. 2A to 2C, the electrode patterning process is not required, but a polarization orientation process has to be applied to the bulk crystal by irradiating a high energy ray according to a pattern to be formed. Further, since a high energy ray is irradiated from a surface of the crystal substrate, no periodical polarization inversion structure can be formed in a direction of thickness of the crystal substrate unlike the case of FIG. 1 described above.

Further, non-linear optical materials, such as $LiNbO_3$ and $LiTaO_3$, which are used as crystal substrates of the periodical polarization inversion structure are bulk type crystals. Thus, there are problems that it is difficult to carry out fine processing and have a high degree of functionality, and a process of combining with other function elements, such as a semiconductor element, is required. Further, when $LiNbO_3$ or the like is used as an optical element, an optical loss may arise because there is a great difference in physical properties between the $LiNbO_3$ and glass often used as a connecting member (for example, optical fiber glass).

Further, it has been proposed that a silica material which does not differ so much from glass in physical properties, specifically an $SiO_2$—$GeO_2$ material, is employed as a non-linear optical material which is possible to be a thin film. However, this non-linear optical material is still under study. Thus, an appropriate and concrete structure of film and its manufacturing method for the purposes of using a non-linear optical silica thin film as an optical conversion element have not yet been proposed.

SUMMARY OF THE INVENTION

An object of the present invention is to provide a non-linear optical silica thin film having desired polarization orientation structure in the thin film.

In order to achieve the object mentioned above, the present invention is made and characterized in that the inside of a non-linear optical silica thin film is polarization oriented by forming the film irradiating charged particles at the time of producing the non-linear optical silica thin film.

By forming a non-linear optical silica thin film irradiating charged particles, distribution of charges arises inside the silica thin film being formed, and according to the distribution of charges, polarization orientation in the silica thin film is automatically controlled to be in a desired state. Thus, almost simultaneously with the completion of forming the non-linear optical silica thin film, a polarization orientation process required for obtaining a non-linear optical effect is completed.

Further, the present invention is characterized in that by the repetition of forming a thin film in a state of irradiating charged particles and forming the thin film in a state of irradiating neutral particles or in a state of non-irradiation of particles when the non-linear optical silica thin film is formed, a plurality of regions in different states of polarization orientation are formed in a direction of film thickness of the silica thin film mentioned above.

In the case of a silica thin film area formed by irradiating charged particles and a silica thin film area formed in a neutral state, a high distribution of charges arises in the film. Therefore, a direction of polarization in a material of the thin film between these two regions are oriented according to the direction of distribution of charges. When a non-linear optical silica thin film is formed by the repetition of forming thin film in a state of irradiating charged particles and forming thin film in a neutral state, a plurality of regions in different states of polarization orientation are formed in a direction of film thickness of the silica in such a manner that the polarization orientation is periodically inverted, whereby a periodical polarization orientation structure for quasi phase matching applicable to optical conversion elements can be easily formed in the film.

Further, in the present invention, when a non-linear optical silica thin film is formed, a plurality of regions in different states of polarization orientation may be formed in a direction of film thickness of the silica thin film by the repetition of forming the thin film by irradiating positive particles and forming the thin film by irradiating negative particles.

Further, in the present invention, it is preferable that in the manufacturing method described above, while shifting the irradiation from particles of one polarity to particles of the other polarity, the silica thin film is formed without further carrying out the irradiation process of particles described above or irradiating neutral particles to the silica thin film.

By forming the silica thin film repeating the irradiation of positive and negative particles, more preferably, interposing a process of forming silica thin film in a neutral state between the irradiation of positive and negative particles, higher distribution of charges arises between a positive particle irradiation region and a negative particle irradiation region of the non-linear silica thin film. Thus, polarization of materials of the silica thin film between these regions is automatically oriented according to a direction of the distribution of charges. Consequently, a plurality of regions in which the conditions of polarization orientation periodically differ can easily be formed in a direction of film thickness of the silica thin film by repeating such a process.

Further, according to another aspect of the present invention, in the manufacturing method described above, a plurality of regions in different states of polarization orientation are formed in a direction of film surface of the silica thin film selectively masking the charged particles to irradiate and irradiating the charged particles to the non-linear optical silica thin film.

By selectively masking charged particles to irradiate, the charged particles are selectively irradiated to the non-linear optical silica thin film, which is being formed, in a direction of its film surface, and selective distribution of charges arises in the irradiated regions, whereby polarization in the film is oriented toward a predetermined direction. Therefore, a plurality of regions in different states of polarization orientation can be formed in the film also in a direction of the film surface simultaneously with the completion of forming the silica thin film.

Further, a non-linear optical silica element according to another aspect of the present invention has a non-linear optical silica thin film, and in the non-linear optical silica thin film, a plurality of regions in different states of polarization orientation are formed in a direction of its film thickness.

Since a plurality of regions in different states of polarization orientation are formed in a direction of film thickness of the silica thin film, if an area of the silica thin film formed in a direction of the surface is a desired area when the silica thin film is formed, for example, polarization orientation regions can be periodically formed in a wider area in a direction of the film thickness and it is easily applicable to an optical conversion lens.

Further, the present invention is characterized in that the non-linear optical silica thin film described above is mainly composed of an $SiO_2$—$GeO_2$.

In a non-linear optical silica material whose main component is the $SiO_2$—$GeO_2$ described above, four-coordinate elements Si and Ge bond together via an element O, thereby forming coordination bonds of an Si—O—Si, an Si—O—Ge, and a Ge—O—Ge. It is considered that a part which causes the material to manifest non-linear characteristics among these coordination bonds is part of a bonded portion of a Ge—O where dangling bonds (unpaired electrons) exist because not all the bonds of four-coordinate element Ge link with the element O and a part of the bonds is left out without being bonded. It is considered that if charged particles are irradiated at the time of forming such a silica thin film material, distribution of charges will arise in the thin film, and all the dangling bonds which exist in the thin film will be oriented toward a predetermined direction according to the distribution of charges arose, whereby polarization orientation will arise in the thin film simultaneously with formation of the silica thin film.

BRIEF DESCRIPTION OF THE DRAWINGS

FIGS. 8A and 8B show a method of forming an $SiO_2$—$GeO_2$ thin film and the thin film obtained according to an aspect 3 of the present invention.

DESCRIPTION OF THE PREFERRED EMBODIMENTS

Preferred aspects of the present invention will subsequently be described with reference to accompanying drawings.

Aspect 1

Figure 3:
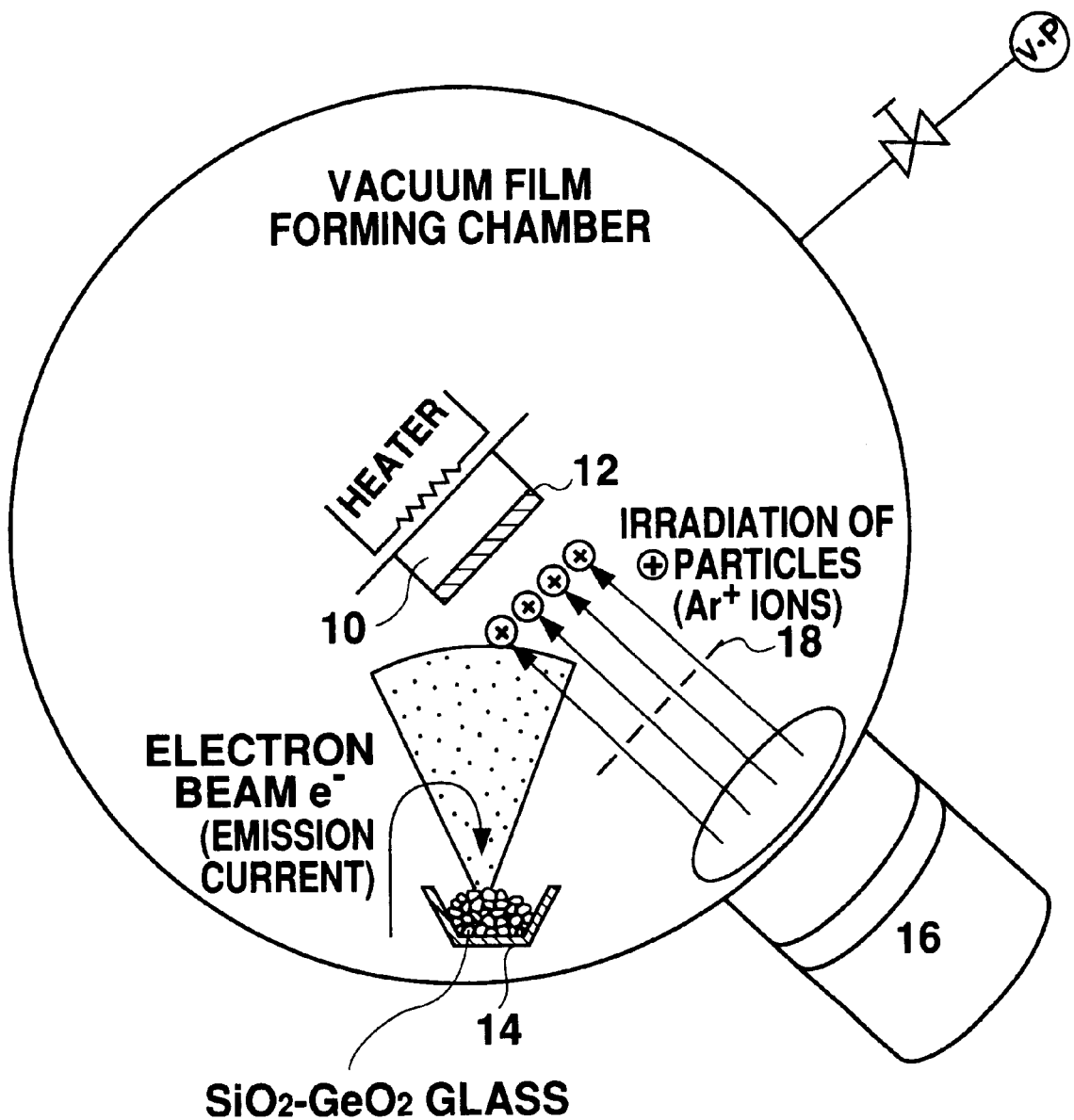
FIG. 3 exemplifies the constitution of a vacuum evaporation device for forming an $SiO_2$—$GeO_2$ thin film having a plurality of polarization orientation regions according to the present invention.

FIG. 3 is a conceptual view showing a film forming device which simultaneously carries out forming of non-linear optical silica thin film mainly composed of $SiO_2$—$GeO_2$ and polarization orientation (poling) according to an aspect 1. An $SiO_2$—$GeO_2$ thin film 12 of the present invention, which manifests a non-linear optical characteristic when polarization in the thin film is oriented toward a predetermined direction, is formed with an optional thickness, for example, on a glass substrate 10 installed in a vacuum film forming chamber as shown in FIG. 3 by electron beam evaporation, other sputtering, or the like.

In the vacuum film forming chamber shown in FIG. 3, a vacuum pump (V.P.) is connected through a valve, and evacuation is achieved up to a predetermined level in the chamber. Further, a pot 14 containing an $SiO_2$—$GeO_2$ glass material which is a material of the thin film is provided in the vacuum film forming chamber. When an $SiO_2$—$GeO_2$ thin film material is vaporized by irradiating electron beams e to the thin film material, the thin film material vaporized is evaporated on the glass substrate 10 and the $SiO_2$—$GeO_2$ thin film 12 is formed. Incidentally, the $SiO_2$—$GeO_2$ thin film 12 may be formed by putting an $SiO_2$ material and a $GeO_2$ material or an $SiO_2$ material and a Ge material into the separate pots 14 to vaporize them, respectively.

An ion source 16 is connected as a charged particle source in the vacuum film forming chamber, and the ion source 16 is arranged in such a manner that charged particles can be irradiated toward the glass substrate 10 in the vacuum film forming chamber. Between the ion source 16 and the $SiO_2$—$GeO_2$ thin film 12 to which irradiation is performed, for example, a grid-shaped neutralizing electrode (neutralizer) 18 is arranged. The neutralizing electrode 18 is provided so that when neutral particles have to be irradiated to the silica thin film 12, neutralization is achieved by providing a positive ion emitted from the ion source with an electron and neutral particles obtained are irradiated to the silica thin film 12 being formed. Incidentally, this neutralizing electrode 18 is not required when the neutral particles are not irradiated to the silica thin film 12.

Figure 4:
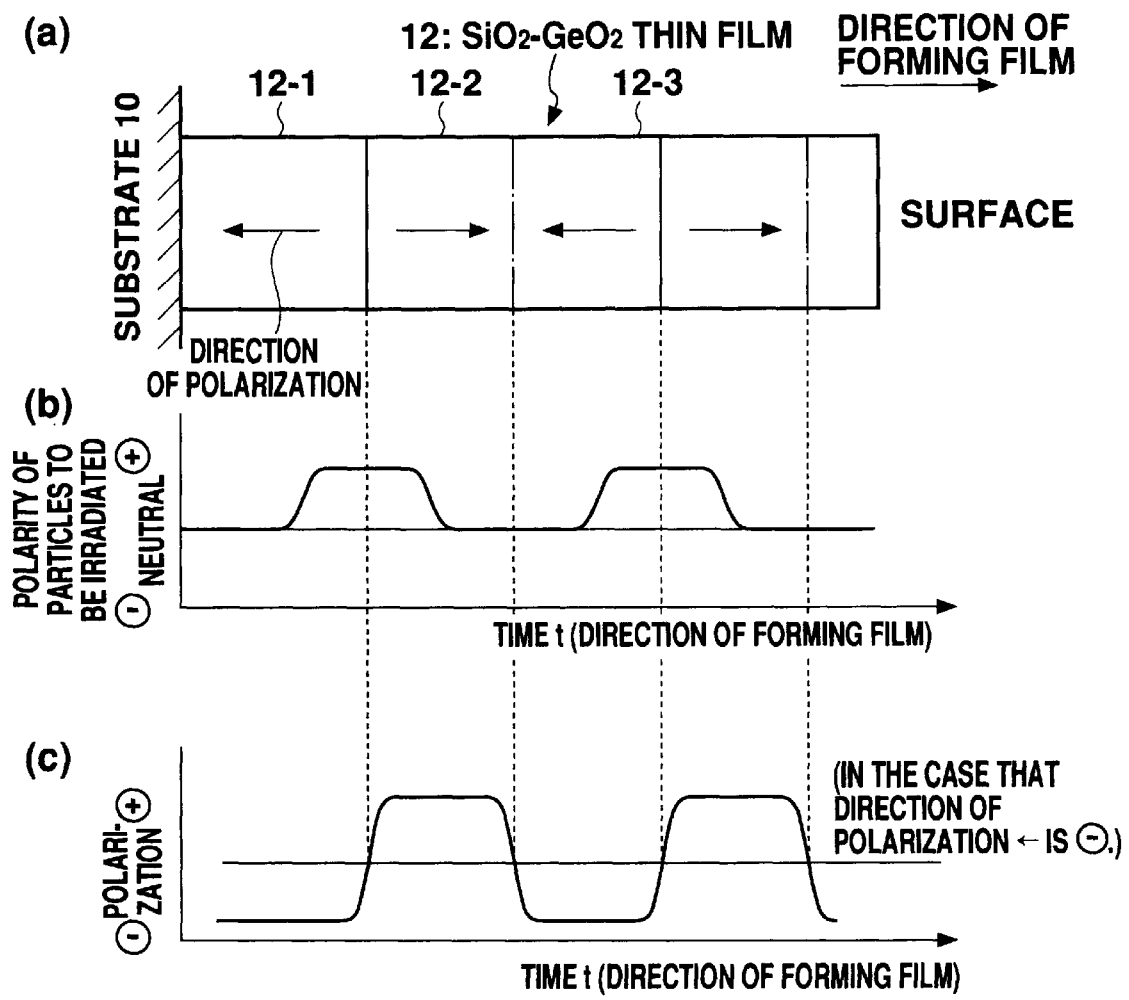
FIG. 4 shows conditions of polarization orientation in an $SiO_2$—$GeO_2$ thin film and a method of controlling irradiation of charged particles according to an aspect 1 of the present invention.
Figure 5A:
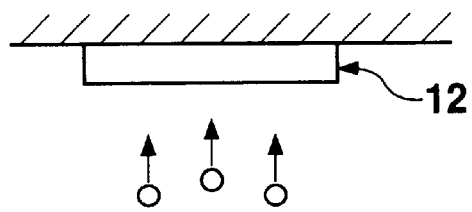
FIGS. 5A, 5B, 5C, and 5D show a procedure of forming an $SiO_2$—$GeO_2$ thin film according to the aspect 1 of the present invention.
Figure 5B:
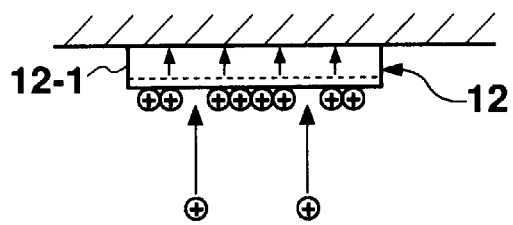
Figure 5C:
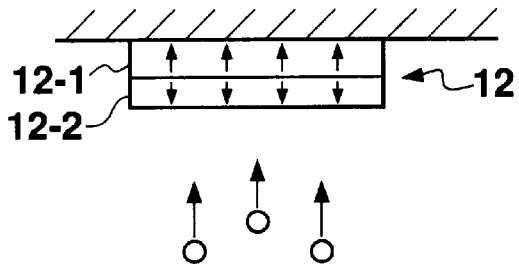
Figure 5D:
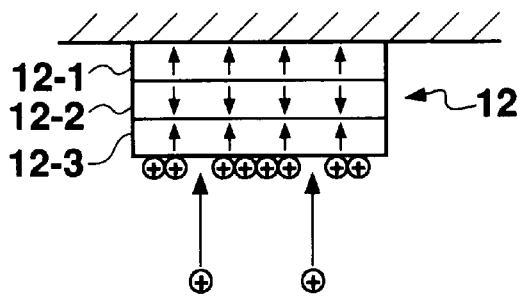

A method of forming the non-linear optical silica thin film 12 whose main material is $SiO_2$—$GeO_2$ and a method of polarization orientation will subsequently be described further with reference to FIGS. 4 and 5. FIG. 4 shows a correlation between the conditions of polarization orientation in the non-linear optical silica thin film 12 and the polarity of particles to be irradiated and timing of the irradiation. More specifically, (*a*) and (*c*) of FIG. 4 show distribution of polarization orientation regions in a direction of forming the silica thin film, and (*b*) of FIG. 4 shows timing of irradiating charged particles. Further, FIGS. 5A to 5D exemplify a procedure of periodically forming polarization orientation regions in a direction of forming the silica thin film as shown in (*a*) of FIG. 4. Incidentally, in the following description, a case of employing $Ar^+$ ions as positive particles will be exemplified.

In the aspect 1, as shown in (*a*) of FIG. 4, the $SiO_2$—$GeO_2$ thin film (silica thin film) 12 is evaporated in a neutral state on the glass substrate 10. Forming the silica thin film 12 in a neutral state is achieved, for example, by emitting $Ar^+$ ions as positive particles from the ion source 16, neutralizing the ions by providing the ions with electrons through the neutralizing electrode 18, and evaporating the $SiO_2$—$GeO_2$ thin film 12 by irradiating the neutral particles (Ar atoms) obtained. Further, it is acceptable to separately connect a neutral particle source to the vacuum film forming chamber and irradiate neutral particles, such as Ar atoms, to the $SiO_2$—$GeO_2$ thin film 12. Further, it is also acceptable to perform evaporation of the $SiO_2$—$GeO_2$ thin film 12 without carrying out an irradiation process of charged particles.

When the $SiO_2$—$GeO_2$ thin film 12 with a predetermined thickness is evaporated in a neutral state, for example, a process of neutralizing $Ar^+$ ions by means of the electrode 18 is terminated and, as shown in (*b*) of FIG. 4, $Ar^+$ ions are irradiated as positive particles to the $SiO_2$—$GeO_2$ thin film 12, which is being formed, on the condition of acceleration voltage of approximately 20 eV to 1 MeV, for example.

By irradiating $Ar^+$ ions as positive particles, distribution of charges arises between an $Ar^+$ ion irradiated region and a neutral region of the $SiO_2$—$GeO_2$ thin film 12 which is formed on the glass substrate 10. Due to the distribution of charges, both the direction of polarization in the region formed in a neutral state and the direction of polarization in a part of the region formed in a state of irradiating positive particles are oriented toward the substrate 10 as shown in (*a*) of FIG. 4, and a region between these regions constitutes a first polarization layer 12-1 in which polarization orientation is carried out almost simultaneously with film formation {see (*c*) of FIG. 4 and FIG. 5B}.

Next, as shown in (*b*) of FIG. 4, the $SiO_2$—$GeO_2$ thin film 12 is formed by evaporation in a neutral state, such as irradiation of the neutral particles neutralized again or non-irradiation of particles. Then, distribution of charges arises in a region already formed in a state of irradiating Ar ions and a region formed in a neutral state, and all the directions of polarization of the $Ar^+$ ions irradiated region formed earlier and the region formed in a neutral state are oriented toward a direction opposite to that of the first polarization layer 12-1, whereby a second polarization layer 12-2 is obtained as shown in (*a*) of FIG. 4 (see FIG. 5C).

After forming the $SiO_2$—$GeO_2$ thin film 12 with a predetermined thickness in a neutral state, evaporation of the $SiO_2$—$GeO_2$ thin film 12 is achieved by irradiating $Ar^+$ ions again as shown in (*b*) of FIG. 4. Thus, as shown in (*a*) of FIG. 4, a third polarization layer 12-3 whose polarizing direction is opposite to that of the second polarization layer 12-2 is formed on the second polarization layer 12-2 (see FIG. 5D).

By evaporating the $SiO_2$—$GeO_2$ thin film periodically repeating thin film formation in a neutral state and thin film formation in a state of radiating positive particles as described above, it is possible to obtain the $SiO_2$—$GeO_2$ thin film in which a plurality of polarization orientation regions whose polarizing directions are inverted are periodically formed in a direction of forming the $SiO_2$—$GeO_2$ thin film (a direction of film thickness).

Here, the thickness of each of the polarization layers 12-1, 12-2, 12-3 . . . can be an optional thickness by rendering the speed of forming the $SiO_2$—$GeO_2$ thin film, the period of irradiating positive particles, the period of forming the film in a neutral state, or the like appropriate, respectively. For example, when the non-linear optical silica thin film obtained in the aspect 1 is used for an optical conversion element or the like, it will be sufficient if the silica thin film is formed by adjusting these conditions mentioned above according to optical conversion efficiency requested and a wavelength of incident light into the element so as to have the optimum periodical polarization orientation structure.

Further, in the aspect 1, a charged particle irradiation region and a region of forming film in a neutral state can be formed through the entire surface of the $SiO_2 GeO_2$ thin film, respectively. Thus, for example, when used for the optical conversion element, if an area of forming the $SiO_2$—$GeO_2$ thin film is set to be the optimum value according to an area of an optical conversion section required, the optical conversion section having a desired area can be formed and also it will easily be applicable to a large-sized optical conversion element or the like.

In the aspect 1, positive particles irradiated are, for example, the positive ions mentioned above. More specifically, other than $Ar^+$ ions, for example, it is possible to use inactive ions which do not react on the $SiO_2$—$GeO_2$ thin film 12 (for example, $He^+$ ions or $Ne^+$ ions), $Ge^+$ ions or $Si^+$ ions which are a part of the material of the film, or $N^+$ ions.

Further, charged particles to be irradiated are not restricted to positive ions, in other words, negative ions can bring about the same results. Electron beams ($e^-$), negative ions ($O^-$ or $SiO_4^-$), or the like can be used as negative particles.

Aspect 2

In an aspect 2, at the time of forming the $SiO_2$—$GeO_2$ thin film, not only positive particles (positive ions), but also negative particles (negative ions or electron beams) are used as charged particles and the irradiation of the positive particles and the negative particles is alternately carried out. Further, during a period of switching the irradiation of positive particles and negative particles, the $SiO_2$—$GeO_2$ thin film is formed in a neutral state (film forming in a state of irradiation of neutral particles or in a state of non-irradiation of charged particles). Similarly to the aspect 1 described above, a desired polarization orientation pattern is formed in a direction of forming the $SiO_2$—$GeO_2$ thin film.

A method of forming the $SiO_2$—$GeO_2$ thin film and a method of controlling polarization orientation according to the aspect 2 will subsequently be described. In the aspect 2, the $SiO_2$—$GeO_2$ thin film can be formed by a forming device similar to that of FIG. 3 mentioned above. However, in the aspect 2, the constitution is such that a negative particle source (for example, an electron beam source) is connected to the vacuum film forming chamber of FIG. 3 and negative particles are emitted at predetermined timing to irradiate them to the silica thin film when the $SiO_2$—$GeO_2$ thin film is formed.

Figure 6:
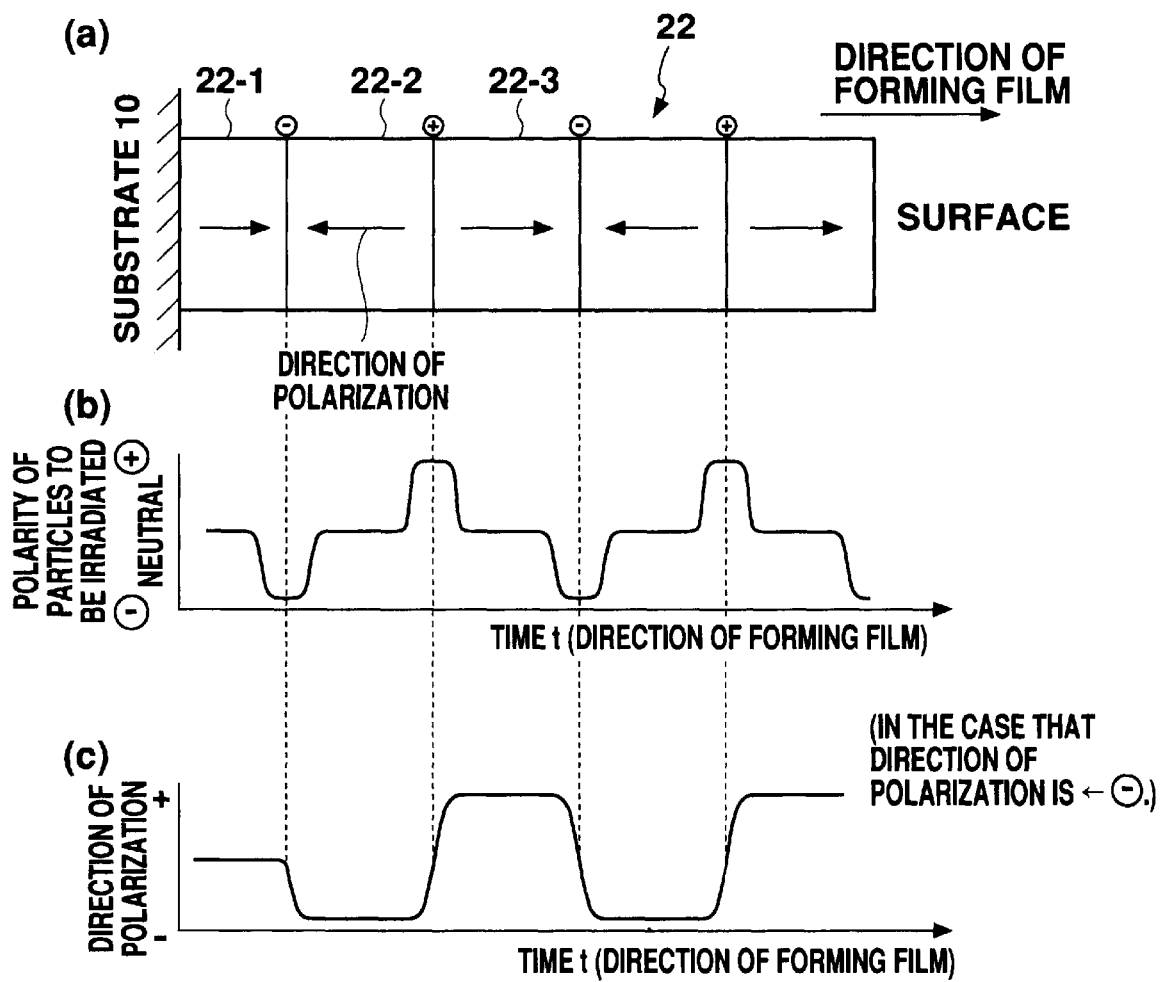
FIG. 6 shows conditions of polarization orientation in an $SiO_2$—$GeO_2$ thin film and a method of controlling irradiation of charged particles according to an aspect 2 of the present invention.

FIG. 6 as a whole shows a correlation between the conditions of polarization orientation in the $SiO_2$—$GeO_2$ thin film 22 and a polarity of particles to be irradiated. More specifically, (a) and (c) of FIG. 6 show distribution of polarization orientation in a direction of forming the silica thin film (a direction of film thickness), and (b) of FIG. 6 shows timing of irradiating charged particles. Further, FIGS. 7A to 7E exemplify a procedure of periodically forming polarization inversion regions, as shown in (a) of FIG. 6, in a direction of forming the silica thin film.

First, on the glass substrate 10, an $SiO_2$—$GeO_2$ thin film 22 is formed by evaporation in a neutral state as shown in (b) of FIG. 6. Forming the thin film in such a neutral state is realized, similarly to the aspect 1, by neutralizing $Ar^+$ ions from the ion source 16, for example, as positive particles through the electrode 18 and irradiating the Ar atoms obtained as neutral particles. Further, it is also preferable to irradiate neutral particles, such as Ar atoms, from a neutral particle source, which is separately provided, to the $SiO_2$—$GeO_2$ thin film 22 without the neutralization process by the electrode 18. It is also preferable to evaporate the $SiO_2$—$GeO_2$ thin film 22 without the process of irradiating particles.

First, the $SiO_2$—$GeO_2$ thin film 22 having a predetermined thickness is formed by evaporation in a neutral state, and then as shown in (b) of FIG. 6 negative particles are irradiated to the $SiO_2$—$GeO_2$ thin film 22 being formed. Electron beams ($e^-$) or negative ions, such as $O^-$ ions or $(SiO_4)^-$ cluster ions can be used as negative particles. Incidentally, a case of using electron beams as negative particles will be exemplified in the following description. When another $SiO_2$—$GeO_2$ thin film 22 is formed by irradiating electron beams on an $SiO_2$—$GeO_2$ thin film 22 which has previously been formed in a neutral state, distribution of charges will arise in a region between the side of the glass substrate 10 of the $SiO_2$—$GeO_2$ thin film 22 and the irradiation side of the electron beams. Consequently, as shown in (a) of FIG. 6 or FIG. 7A, all the directions of polarization in the $SiO_2$—$GeO_2$ thin film 22 are oriented toward a direction of the surface of the thin film from the glass substrate 10, for example, and a first polarization layer 22-1 is formed.

After forming the $SiO_2$—$GeO_2$ thin film 22 up to a predetermined thickness irradiating the electron beams, as shown in (b) of FIG. 6 the $SiO_2$—$GeO_2$ thin film 22 is formed in a neutral state. As described above, when shifted from a process of irradiating electron beams to a process of forming the $SiO_2$—$GeO_2$ thin film 22 in a neutral state, distribution of charges in a direction opposite to that of the first polarization layer 22-1 mentioned above arises in the $SiO_2$—$GeO_2$ thin film and forming a second polarization layer 22-2 is started (see FIG. 7B).

After forming the $SiO_2$—$GeO_2$ thin film 22 having a predetermined thickness in a neutral state, here, as shown in (b) of FIG. 6 the $SiO_2$—$GeO_2$ thin film 22 is formed by irradiating $Ar^+$ ions as positive particles. Then, distribution of charges between the electron beam irradiation region and this $Ar^+$ ion irradiation region becomes much larger, and the second polarization layer 22-2 whose polarization is oriented toward a direction opposite to the direction of polarization of the first polarization layer 22-1 is formed on the first polarization layer 22-1 (see FIG. 7C).

Here, the process is not immediately shifted from irradiation of electron beams to irradiation of $Ar^+$ ions. This is because if the irradiation of negative particles is immediately changed to the irradiation of positive particles, charges of the positive particles irradiated are neutralized on a surface of the thin film while the thin film charged with negative electricity becomes positive, whereby polarization orientation cannot properly be controlled.

As shown in (b) of FIG. 6, after the $SiO_2$—$GeO_2$ thin film 22 is formed for a predetermined period irradiating $Ar^+$ ions, the $SiO_2$—$GeO_2$ thin film 22 is formed again by evaporation in a neutral state. Thus, distribution of charges arises in a direction opposite to that shown in FIG. 7C, and it begins to form a third polarization layer 22-3 in which polarization is oriented toward an opposite direction on the second polarization layer 22-2 (see 7D).

After forming an $SiO_2$—$GeO_2$ thin film in a neutral state, an electron beam is irradiated forming $SiO_2$—$GeO_2$ thin film 22 again. Thus, distribution of charges becomes larger between an $Ar^+$ ion irradiated region at the tip of the $SiO_2$—$GeO_2$ thin film 22 and this electron irradiated region, and the third polarization layer 22-3 whose polarizing direction is opposite to that of the second polarization layer 22-2 is formed on the second polarization layer 22-2 with the electron beam irradiated region being the border (FIG. 7E). Incidentally, the reason why the process is not directly changed from irradiation of $Ar^+$ ions to irradiation of electron beams is the same as the case which the negative particle irradiating state is shifted to the positive particle irradiating state described above.

By repeating the procedure described above, in the aspect 2, the $SiO_2$—$GeO_2$ thin film whose polarizing direction is inverted can be periodically formed in a direction of forming the film (a direction of film thickness) as shown in (a) of FIG. 6. Further, in the aspect 2, while forming the $SiO_2$—$GeO_2$ thin film, a positive particle irradiation region and a negative particle irradiation region are alternately formed with a region of forming the thin film in a neutral state between these regions, whereby an incline of discharge distribution becomes larger than that of the $SiO_2$—$GeO_2$ thin film according to the aspect 1. Therefore, a degree of the polarization orientation in each of the polarization layers 22-1, 22-2, 22-3 . . . becomes larger and it tends to have a stronger non-linear optical feature.

Each of the polarization layers 22-1, 22-2, 22-3 . . . can have an optional thickness by appropriately setting the value for a speed of forming the $SiO_2$—$GeO_2$ thin film, a period of irradiating positive and negative particles, a period of forming the film in a neutral state, and the like, respectively.

Therefore, similarly to the aspect 1 described above, when used for an optical conversion element or the like, it is very easy to optimize the periodical polarization inversion structure according to the optical conversion efficiency requested or wavelength of incident light into the element. Further, similar to the aspect 1, a charged particle irradiation region and a region of forming the film in a neutral state can be formed through the entire surface of the $SiO_2$—$GeO_2$ thin film, and an area of the optical conversion section can be optionally set when used for an optical conversion element by optionally setting an area of forming the $SiO_2$—$GeO_2$ thin film.

Aspect 3

In the aspects 1 and 2 described above, a desired polarization orientation region is periodically formed in a direction of the film thickness of the $SiO_2$—$GeO_2$ thin film. However, in this aspect 3, a polarization orientation region is formed in a desired pattern in a direction of the surface of the thin film simultaneously with forming of the $SiO_2$—$GeO_2$ thin film. Here, the $SiO_2$—$GeO_2$ thin film can be formed by a film forming device having the constitution similar to that of the vacuum film forming device of FIG. 3. However, in the aspect 3, a metal mask is arranged between a charged particle source, such as the ion source 16 of FIG. 3, and the $SiO_2$—$GeO_2$ thin film to be irradiated and charged particles are selectively irradiated on the $SiO_2$—$GeO_2$ thin film by means of this metal mask.

A method of forming the $SiO_2$—$GeO_2$ thin film and a method of polarization orientation according to the aspect 3 will subsequently be described with reference to FIGS. 8A and 8B. In FIG. 8A, in front of an $SiO_2$—$GeO_2$ thin film 32 which is formed downward, the metal masks 34 described above are grounded and arranged to selectively mask irradiation of positive ions to the $SiO_2$—$GeO_2$ thin film 32. Thus, positive ions (for example, $Ar^+$ ions) are selectively irradiated to the $SiO_2$—$GeO_2$ thin film 32 being formed, and only the positive ion irradiated region is polarization oriented toward a single direction along a direction of forming the thin film similarly to the aspects 1 and 2 described above. A region to which irradiation of positive ions is obstructed by the metal mask 34 is not polarization oriented.

When the $SiO_2$—$GeO_2$ thin film 32 is formed up to a predetermined thickness under such conditions, as shown in FIG. 8B, a polarization orientation region 32a and a non-polarization orientation region 32b are formed in a direction of the surface of the $SiO_2$—$GeO_2$ thin film 32 corresponding to a pattern of the metal masks in such a manner that they penetrate from the bottom surface to the top surface of the thin film 32 in a direction of the film thickness of the thin film 32.

Figure 1:
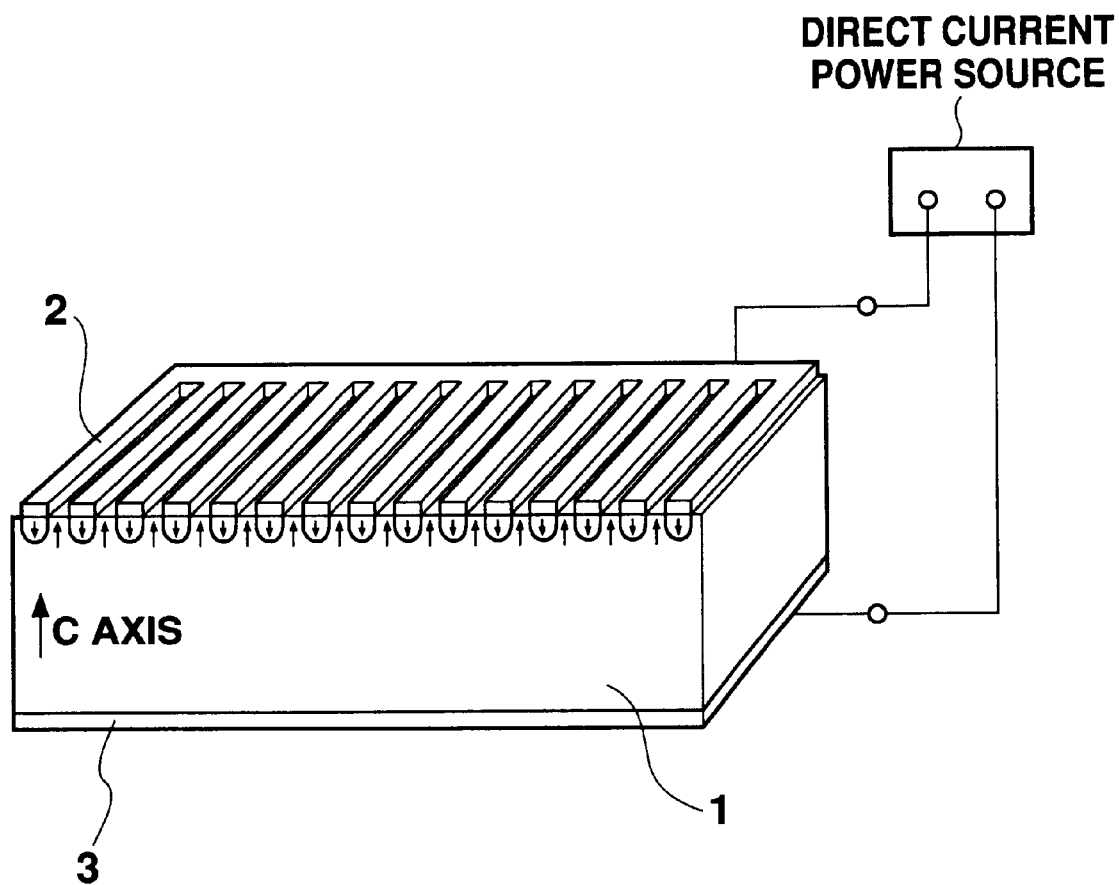
FIG. 1 shows a method of forming polarization inversion structure in a conventional bulk crystal.
Figure 2A:
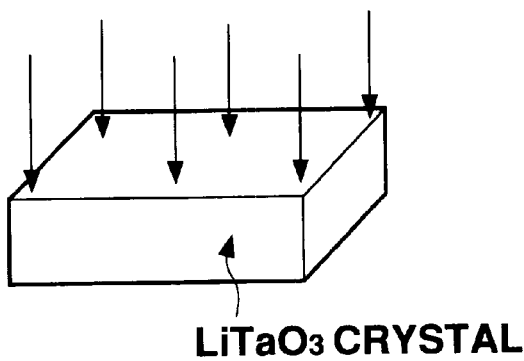
FIGS. 2A, 2B, and 2C show another method of forming polarization inversion structure in a conventional bulk crystal.
Figure 2B:
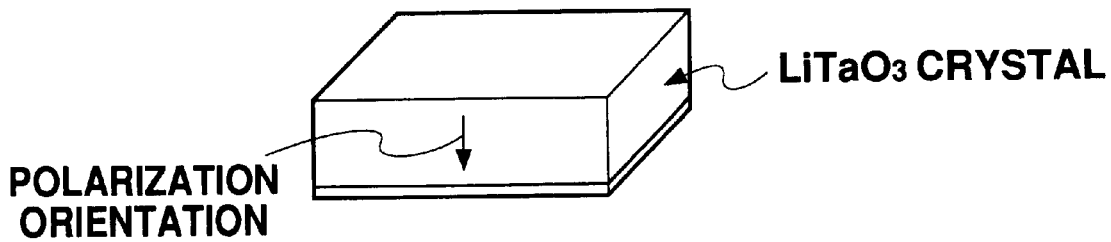
Figure 2C:
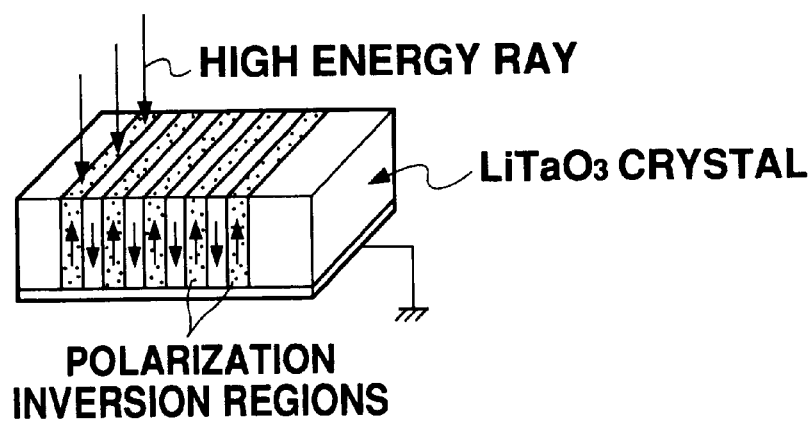

By arranging such that a direction of the surface of the $SiO_2$—$GeO_2$ thin film 32 formed is an optical path and rendering length of the polarization orientation region 32a and the non-polarization orientation region 32b in a direction of the optical path appropriate for quasi phase matching, the $SiO_2$—$GeO_2$ thin film 32 obtained in the aspect 3 can be utilized for an optical conversion element having high efficiency or the like. Here, in the case of a conventional method of forming an electrode on an $LiNbO_3$ crystal and carrying out polarization orientation of the crystal by applying voltage, it is substantially impossible to form a polarization inversion region which penetrates the crystal in a direction of the thickness. Further, in the case that a polarization inversion region is formed in the crystal by irradiating a high energy ray to the crystal as shown in the conventional FIGS. 2A and 2C, an extremely high energy ray has to be irradiated so as to make the polarization inversion region thicker. On the contrary, in the aspect 3, if charged particles are irradiated at the time of forming the $SiO_2$—$GeO_2$ thin film, polarization orientation will automatically arise in the irradiated area, making it easy to form a polarization orientation region with an optional thickness. It is also easy to have a wide diametral optical path (aperture) when used for an optical conversion element.

Aspect 4

In an aspect 4, similarly to the aspect 3 described above, a polarization orientation region in a desired pattern is formed in a direction of the surface of the $SiO_2$—$GeO_2$ thin film, but not only irradiation of positive particles, but also irradiation of negative particles is performed, and polarization orientation regions are formed by the respective irradiation of positive particles and negative particles.

Figure 9A:
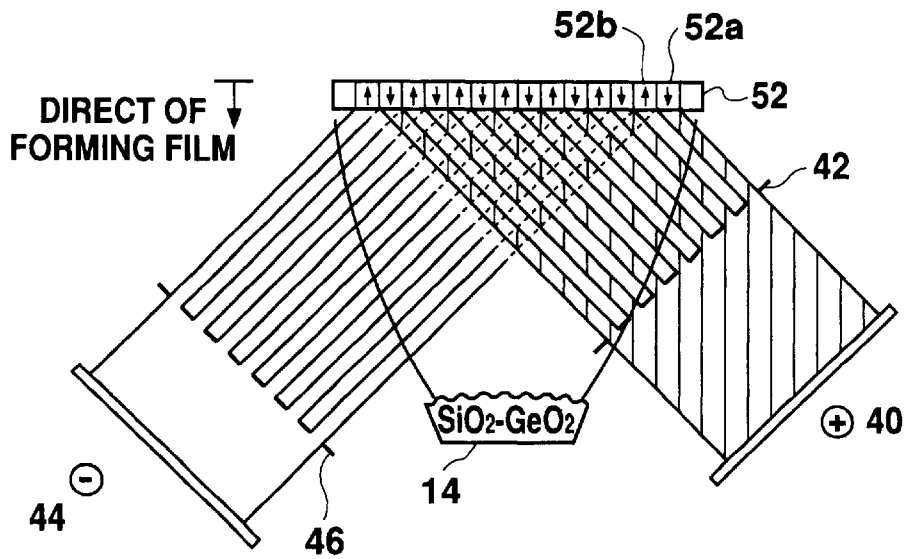
FIGS. 9A and 9B show a device for forming an $SiO_2$—$GeO_2$ thin film and the thin film obtained according to an aspect 4 of the present invention.
Figure 9B:
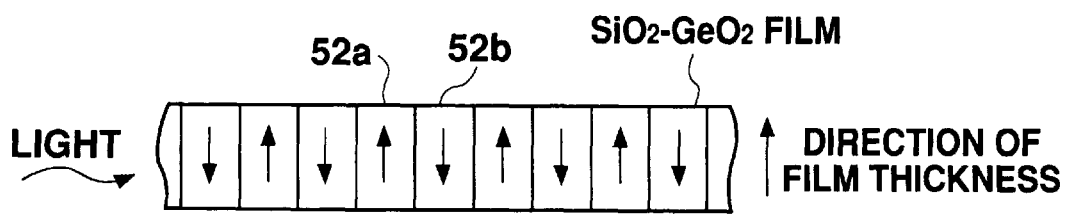

FIG. 9A shows the constitution of a device for forming the $SiO_2$—$GeO_2$ thin film and carrying out polarization orientation according to the aspect 4. Further, FIG. 9B shows an $SiO_2$—$GeO_2$ thin film 52 which is formed by the device of FIG. 9A. The overall constitution of the device for forming the $SiO_2$—$GeO_2$ thin film 52 is common to that of the film forming device of FIG. 3, but in this aspect 4, an ion source 40 for positive particles and an electron beam source 44 for negative particles are provided as a charged particle source, respectively, and these sources are connected to a vacuum film forming chamber. Further, between the positive ion source 40 and the $SiO_2$—$GeO_2$ thin film 52 to be irradiated, a grounded positive ion mask (a mask for positive particles) 42 is arranged and a polarization orientation portion (a positive region) of the mask 42 is opened so as to selectively irradiate positive ions (for example, $Ar^+$ ions) on the $SiO_2$—$GeO_2$ thin film. Similarly, between the electron beam source 44 and the $SiO_2$—$GeO_2$ thin film 52, an electron beam mask (a mask for negative particles) 46 set to a predetermined potential is arranged, and the mask 46 is provided with a polarization orientation portion (a negative region) opened in order to selectively irradiate electron beams on the $SiO_2$—$GeO_2$ material is contained is arranged in the vacuum film forming chamber in order not to obstruct the masks 42 and 46, and radiation paths of positive ions and electron beams.

Figure 7A:
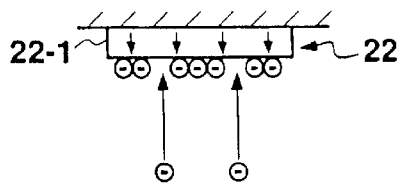
FIGS. 7A, 7B, 7C, 7D, and 7E show a procedure of forming an $SiO_2$—$GeO_2$ thin film according to the aspect 2 of the present invention.
Figure 7B:
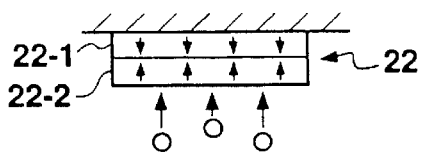
Figure 7C:
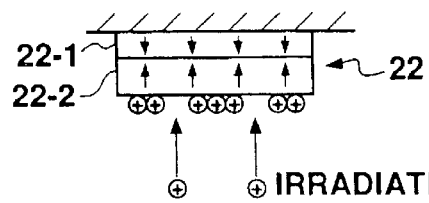
Figure 7D:
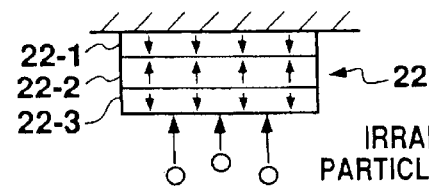
Figure 7E:
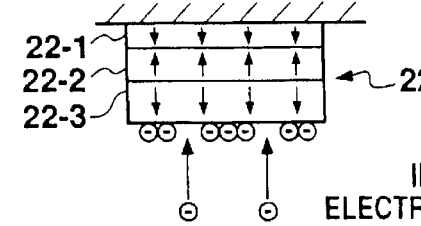

Due to the constitution described above, while forming the $SiO_2$—$GeO_2$ thin film 52, positive ions are selectively irradiated on a region of the $SiO_2$—$GeO_2$ thin film 52 which corresponds to an open region of the positive ion mask 42, thereby forming, for example, a region 52a in which polarization orientation is made along a direction of film thickness as shown by a downward arrow of FIG. 7(a). Further, on a region corresponding to an open region of the electron beam mask 46, electron beams are selectively irradiated while the $SiO_2$—$GeO_2$ thin film 52 is formed, thereby forming, for example, a region 52b in which polarization orientation is carried out in a direction opposite to that of the region 52a by 180 degrees as shown by an upward arrow of FIG. 9A.

The positive ion mask 42 and the electron beam mask 46 are formed in a direction of the surface of the thin film in such a manner that the positive ion irradiation region 52a and the electron beam irradiation region 52b do not overlap with each other and the respective open regions become mask regions of the other side. They are also positioned in the vacuum film forming chamber.

Further, in the aspect 4, it is acceptable to irradiate respectively at the same timing positive particles and negative particles to the regions 52a and 52b of the $SiO_2$—$GeO_2$ thin film being formed. However, from a viewpoint that positive and negative charges should be prevented from neutralizing each other, the $SiO_2$—$GeO_2$ thin film 52 may be formed, for example, alternately providing a positive particle irradiation period and a negative particle irradiation period.

Further, in the aspects 3 and 4, a plurality of polarization orientation regions are periodically formed in a direction of the surface of the $SiO_2$—$GeO_2$ thin film. However, it is also acceptable to form the $SiO_2$—$GeO_2$ thin film controlling the direction of polarization to periodically shift toward a direction of the film thickness of the $SiO_2$—$GeO_2$ thin film similarly to the aspects 1 and 2 as occasion demands.

In the aspects 1 to 4 described above, when the $SiO_2$—$GeO_2$ thin film is formed irradiating charged particles or in a neutral state, application of an electric field to the $SiO_2$—$GeO_2$ thin film for the purposes of polarization orientation is not performed. This is because the method of the present invention enables automatic polarization orientation by irradiating charged particles to provide charges in the $SiO_2$—$GeO_2$ thin film without applying an electric field. However, it is also preferable to form the $SiO_2$—$GeO_2$ thin film and carry out a process of polarization orientation by applying an electric field. Further, if charges are accumulated by irradiating charged particles to the $SiO_2$—$GeO_2$ thin film which is a dielectric, a large distribution of charges may partially arise in the thin film and a dielectric breakdown of the thin film may take place. Thus, for the purposes of preventing such a dielectric breakdown, an appropriate electric field may be applied as an outside electric field to the $SiO_2$—$GeO_2$ thin film being formed. In this case, although it is not restricted to the following, it is preferable to adjust the outside electric field so that dielectric breakdown field of the thin film is weaker than a combination of an applied outside electric field and an electric field caused by surface charges.

In the aspects 1 to 4 described above, $Ar^+$ ions are exemplified as positive ions which are positive particles, but as described above, not only $Ar^+$ ions, but also $He^+$ ions, $Ne^+$ ions, $Ge^+$ ions, $Si^+$ ions, and further $N^+$ ions can be used. Further, an electron beam is not the only one to be used as a negative particle as described above, and $O^-$ ions, $(SiO_4)^-$ cluster ions, and the like can also be adopted. Incidentally if, for example, $N^+$ ions among from these ions are irradiated, it will be more likely that nitrogen irradiated remains in an $N^+$ ion irradiation region of the $SiO_2$—$GeO_2$ thin film.

Next, in the aspects 1 to 4 described above, irradiation power of an $Ar^+$ ion can be within a range of acceleration voltage 20e V to 1 MeV. For example, when $Ar^+$ ions are irradiated at an acceleration voltage of approximately 100 eV, optical absorption in a practical wavelength area becomes comparatively small. On the other hand, when $Ar^+$ ions are irradiated at an acceleration voltage of approximately 1 keV, non-linear characteristics of optical features of the $SiO_2$—$GeO_2$ thin film increase. Therefore, it is preferable to set such an acceleration voltage according to a feature of the $SiO_2$—$GeO_2$ thin film requested. Incidentally, a degree of polarization orientation of the $SiO_2$—$GeO_2$ thin film is dependent not only on the acceleration of a particle, such as an ion or an electron, but also on an ionic current to be irradiated and a quantity of electron beams. Therefore, it is preferable to control the value of current and the like to be appropriate so that appropriate conditions of polarization orientation can be achieved according to a non-linear optical feature requested.

What is claimed is:

1. A method for manufacturing a non-linear optical silica thin film comprising the steps of (a) vaporizing $SiO_2$ and $GeO_2$ to form a first $SiO_2$—$GeO_2$ thin film having dangling bonds on a substrate, and (b) irradiating the first $SiO_2$—$GeO_2$ thin film, while it is being formed, with charged particles to effect polarization orientation in the first $SiO_2$—$GeO_2$ thin film by orienting the dangling bonds toward a predetermined direction, wherein the first $SiO_2$—$GeO_2$ thin film being formed is alternately irradiated with positively charged particles and negatively charged particles to form at least a second layer of $SiO_2$—$GeO_2$ thin film having a different polarization orientation in a direction of the first $SiO_2$—$GeO_2$ thin film thickness.

2. The method of claim 1, wherein, during a period of shifting the irradiating of the thin film with particles having one charge to irradiating it with particles having the other charge, the thin film is formed without particle irradiation or with irradiation by neutral particles.

3. The method of claim 1, further comprising selectively masking portions of the layers of $SiO_2$—$GeO_2$ thin film being formed to form a plurality of regions having different polarization orientations in a direction of the surface of the first $SiO_2$—$GeO_2$ thin film.

* * * * *